Feb. 28, 1933.  F. BAUER  1,899,741

DYNAMO ELECTRIC MACHINE

Filed May 20, 1930

INVENTOR
Friedrich Bauer
BY
ATTORNEY

Patented Feb. 28, 1933

1,899,741

UNITED STATES PATENT OFFICE

FRIEDRICH BAUER, OF BERLIN-CHARLOTTENBURG, GERMANY, ASSIGNOR TO WESTINGHOUSE ELECTRIC & MANUFACTURING COMPANY, A CORPORATION OF PENNSYLVANIA

DYNAMO-ELECTRIC MACHINE

Application filed May 20, 1930, Serial No. 453,919, and in Germany May 24, 1929.

My invention relates to dynamo-electric machines and particularly to such machines as have direct-current windings but are adapted to be fed from an alternating-current source.

It is frequently desirable to have a motor adjustable over a wide range of speed and to operate substantially at a constant speed after such adjustment has been made. In many cases, it is also desirable to provide a machine having a constant-speed characteristic, regardless of the load the machine is carrying.

The first class of loads may best be supplied by a shunt-wound direct-current machine, and the second by the usual synchronous machine. However, machines of both types are restricted in their fields of operation, particularly when only small amounts of power are desired. This restriction is mainly caused by the wide-spread alternating-current supply networks.

Where large blocks of power are to be used to drive loads of either of the above classes, it is frequently economically possible to supply motor-generators or commercial rectifiers to supply direct current for such loads. It is frequently possible, of course, to provide a direct-connected exciter for a synchronous motor, but, where the output of a motor is comparatively small, this is economically inadvisable.

My device may also be economically used to provide an exciting circuit for portable alternating-current generators, such as those used on construction jobs for operating riveters and drills. These tools are often designed for 180-cycle supply which is either supplied by a motor-generator set, or by a gasoline-driven generator, in either case, direct-current excitation being desirable.

It is the object of my invention to provide a dynamo-electric machine having one or more windings adapted to the use of direct or uni-directional current, but which may be supplied from an alternating-current source of supply. I accomplish this by providing a rectifying device of the dry type, such as a copper-oxide rectifier, built into the casing of a machine of either of the above-specified types.

Other objects and advantages of my invention will be apparent from the following detailed description, taken in conjunction with the appended drawing, in which, Fig. 1 is an elevation, partly in section, of one form of motor embodying my invention.

Figure 1:
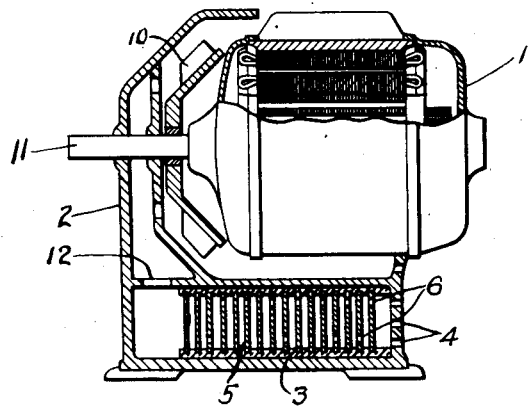

The apparatus disclosed in the figures comprises a motor casing 1, which may enclose either a direct-current motor or a motor of any other type having a stationary and a rotating winding and requiring a direct or unidirectional current supply for at least one of its windings. An auxiliary casing 2, encloses the motor casing 1, and a rectifying unit 3, preferably of the copper-oxide type. The casing 2 is provided, in the vicinity of the rectifier 3, with openings 4, to permit ventilation of the rectifier elements 5. The individual elements of the rectifier are preferably provided with openings 6 to permit the passage of cooling fluids therethrough.

In order to provide a flow of cooling fluid, a blower or fan, 10, preferably mounted on the shaft 11 of the motor, is in communication with a second passage 12, communicating with the rectifier chamber. The fan draws air or other cooling fluid through the rectifying chamber and delivers the same to the motor.

Figure 2:
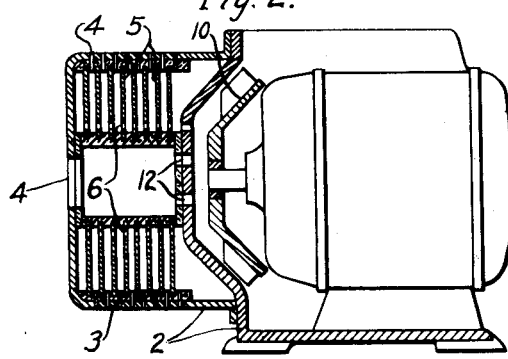
Fig. 2 is a sectional elevation of a motor embodying a modification of my invention.
Figure 3:
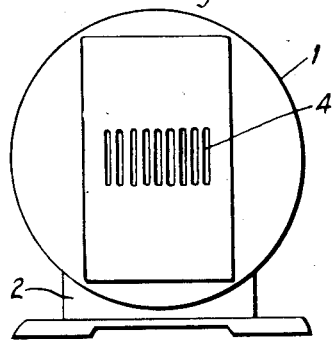
Fig. 3 is an end view of the motor shown in Fig. 2.
Figure 4:
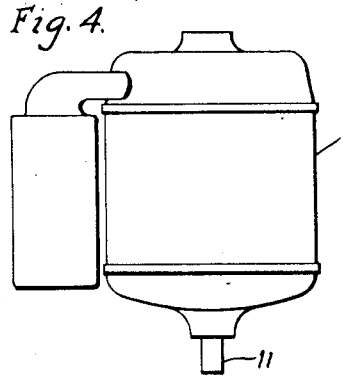
Fig. 4 is a plan view of a motor embodying a further modification of my invention, showing another means of mounting my rectifier element and of ventilating the machine.
Figure 5:
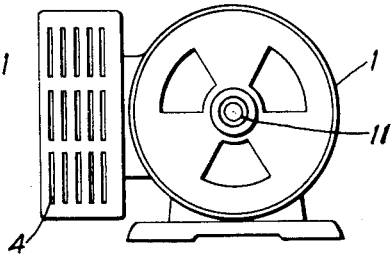
Fig. 5 is an end view of the machine shown in Fig. 4.
Figure 6:
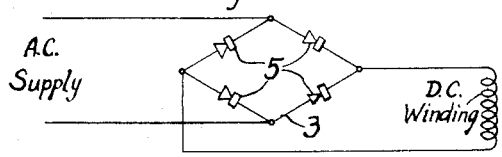
Fig. 6 is a schematic diagram of the motor connections.

If the motor is of the totally-enclosed type shown in Figs. 1 to 3, the cooling fluid will pass over the external surface of the motor casing 1, but, preferably, the motor will be cooled by passing the cooling fluid directly over the winding, as shown in Figs. 4 and 5.

The unitary casing may be made in any one of many shapes in order to best adapt the motor for installation in various positions. As shown in Fig. 1, the rectifier unit may be placed in the base of the motor, in order to conserve floor space, or it may be placed in a longitudinal extension of the casing to diminish the overall height of the motor, as shown in Figs. 2 and 3.

A still further modification is disclosed in Figs. 4 and 5, in which the rectifier unit is located in a side extension of the casing.

I do not desire to restrict my invention to any one of the specific embodiments herein shown and described, since it is evident that it may be further modified without departing from its spirit and scope, as defined in the appended claims.

I claim as my invention:

1. A unitary electrical device comprising a direct-current motor, a current-rectifying device for supplying direct current to said motor from an alternating-current source, a casing enclosing both said motor and said rectifier, and a fan for circulating air through said casing to cool both the rectifier and the motor.

2. A unitary electrical device comprising a stationary winding and a rotating winding, one of said windings requiring a unidirection-current supply, an alternating current supply for said winding, a rectifying unit for supplying unidirectional current to said winding from said supply, a unitary casing surrounding said windings and said rectifier and means operatively connected to said rotating winding for cooling both said windings and said rectifying unit.

In testimony whereof, I have hereunto subscribed my name this 26th day of April 1930.

FRIEDRICH BAUER.